(12) United States Patent
Keranen et al.

(10) Patent No.: US 10,061,732 B2
(45) Date of Patent: Aug. 28, 2018

(54) ENABLING ARRANGEMENT FOR AN ELECTRONIC DEVICE WITH HOUSING-INTEGRATED FUNCTIONALITIES AND METHOD THEREFOR

(71) Applicant: TactoTek Oy, Kempele (FI)

(72) Inventors: Antti Keranen, Kempele (FI); Juhani Harvela, Kempele (FI)

(73) Assignee: TACTOTEK OY, Oulunsalo (FI)

( * ) Notice: Subject to any disclaimer, the term of this patent is extended or adjusted under 35 U.S.C. 154(b) by 510 days.

(21) Appl. No.: 14/278,417

(22) Filed: May 15, 2014

(65) Prior Publication Data

US 2014/0344497 A1    Nov. 20, 2014

Related U.S. Application Data

(60) Provisional application No. 61/823,438, filed on May 15, 2013.

(51) Int. Cl.
*G06F 13/40* (2006.01)
*G06F 13/38* (2006.01)

(52) U.S. Cl.
CPC ............ *G06F 13/40* (2013.01); *G06F 13/385* (2013.01); *G06F 13/4009* (2013.01)

(58) Field of Classification Search
CPC ...... G06F 1/1626; G06F 1/1632; G06F 1/169; G06F 1/1694; G06F 1/1628; G06F 2200/1636; G06F 2203/04105
See application file for complete search history.

(56) References Cited

U.S. PATENT DOCUMENTS

| | | | |
|---|---|---|---|
| 8,150,482 B2 * | 4/2012 | Matsuoka | H04M 1/0235 379/433.01 |
| 8,718,728 B2 * | 5/2014 | Katis | H04B 1/3888 455/575.8 |

(Continued)

FOREIGN PATENT DOCUMENTS

| | | |
|---|---|---|
| EP | 2262211 A1 | 12/2010 |
| JP | 2003533134 A | 11/2003 |

(Continued)

OTHER PUBLICATIONS

International Search Report, dated Sep. 10, 2014, from corresponding PCT application.

(Continued)

*Primary Examiner* — Brian T Misiura
(74) *Attorney, Agent, or Firm* — Robert P. Michal, Esq.; Carter, DeLuca, Farrell & Schimdt, LLP

(57) ABSTRACT

An electronic device includes a housing, or a 'cover', the housing material molded into a desired target shape and to at least partially embed a plurality of functional elements and an enabling arrangement, optionally at least partially embedded in the housing, the enabling arrangement including: a first connector with a first plurality of connecting elements to establish a connection between the plurality of functional elements and the enabling arrangement, a second connector with one or more second connecting elements to be connected a host device utilizing the functionalities associated with the functional elements, a memory for storing and retrieval of instructions, and processing elements capable of transforming signals from a one known format to another predetermined format according to stored instructions. A corresponding method is presented.

19 Claims, 2 Drawing Sheets

(56) References Cited

U.S. PATENT DOCUMENTS

| | | | | |
|---|---|---|---|---|
| 9,153,088 B2* | 10/2015 | Spencer, II | .......... | G06Q 20/327 |
| 9,325,381 B2* | 4/2016 | Gutierrez | ............. | H04B 5/0031 |
| 9,400,572 B2* | 7/2016 | VanBlon | ............... | G06F 3/0416 |
| 9,774,192 B2* | 9/2017 | Wojcik | ...................... | H02J 4/00 |
| 2005/0026661 A1* | 2/2005 | Rheenen | ................. | G06F 21/31 |
| | | | | 455/575.8 |
| 2008/0288036 A1* | 11/2008 | Greenberg | ........... | A61N 1/0541 |
| | | | | 607/115 |
| 2009/0218041 A1* | 9/2009 | Dean | ........................ | C09J 5/00 |
| | | | | 156/305 |
| 2010/0078343 A1 | 4/2010 | Hoellwarth et al. | | |
| 2013/0301863 A1* | 11/2013 | Weaver, III | .......... | H04R 1/2853 |
| | | | | 381/334 |
| 2014/0141846 A1* | 5/2014 | Weaver, III | ............. | H04M 1/04 |
| | | | | 455/575.1 |

FOREIGN PATENT DOCUMENTS

| | | |
|---|---|---|
| JP | 2010288066 A | 12/2010 |
| WO | 2009076561 A2 | 6/2009 |

OTHER PUBLICATIONS

Notice of Reasons for Rejection issued by the Japanese Patent Office in relation to Japanese Application No. 2016-513417 dated Jun. 5, 2018 (2 pages) along with English translation (3 pages).

\* cited by examiner

ENABLING ARRANGEMENT FOR AN ELECTRONIC DEVICE WITH HOUSING-INTEGRATED FUNCTIONALITIES AND METHOD THEREFOR

FIELD OF THE INVENTION

Generally the present invention concerns electronic devices and related components. Particularly, however not exclusively, the invention pertains to an electronic device with integrated functional components and an enabling arrangement for feasibly providing the electronic device functionalities associated with said functional components.

BACKGROUND

In user interfaces (UI) of electronic devices such as computers including desktop, laptop and palmtop devices, the use of simple switches, buttons, and knobs have been superseded by keyboards, keypads, mouse controllers, speech recognition input means, touch displays and related UI means like a touchpad.

In particular, touch surfaces such as touchpads and touchscreens undoubtedly form the 'de facto' UI of modern smartphones, tablets and supplementary UI of many desktop computers as well. The touch displays may generally apply to a number of different technologies for implementing the touch-sensitive functionality. Among various other potential options, e.g. capacitive, resistive, infrared, optical imaging (camera-based), frustrated total internal reflection (FTIR), acoustic, and hybrid solutions are feasible.

Many electronic devices, such as smart phones, comprising a number of touch-sensitive surfaces are also capable of executing a number of other functionalities many of which can be provided through additional components arranged into the device. For example, vibration/tactile functions are often enabled by such dedicated components.

Further, in many cases it may be feasible to arrange many of the functional components of the device closer to its physical user interface, for example by at least partially embedding the components in the housing material of the device. Whether functional components are disposed within the device on circuit boards or embedded in the housing material, the plurality of available and possible components and combinations thereof is such that bringing the functionalities associated with the functional components to the advantage of the device requires often extensive configuration and integration on many levels of the device design. In later phases this approach may prove inflexible to changes in the design.

Traditionally the approach has been using dedicated controllers and drivers for the functional components or achieving the same by including the needed controllers and drivers in the host device. Depending on the number of functional components this also leads to the need to have a large number of conductors originating from the components to be connected to the host device. Additionally, the type of signals carried by these conductors can largely vary. This requires the host to either be able to process this kind of signals or the signals to be transformed to a suitable format prior to introducing them to the host.

The traditional approaches are space consuming, inflexible and expensive, which has set various limitations to the designers and manufacturers trying to produce top notch end products. Advances in functional components and materials have made it possible to design advanced device and interface concepts but previous solutions for enabling functionalities associated with these components have generally performed poorly in view of integration and sometimes also functionality.

SUMMARY

The objective of the embodiments of the present invention is to at least alleviate one or more of the aforesaid drawbacks evident in the prior art arrangements particularly in the context of touch-based input arrangements. The objective is generally achieved with a device, arrangement and a corresponding method in accordance with the present invention.

According to an exemplary embodiment of the present invention the device may comprise housing, or specifically housing material, -integrated functional components, such as electronic, electro-optic, electroacoustic, piezoelectric, electric, and/or electromechanical components, or elements with functionalities at least comprising such components. The device may so comprise or constitute simple buttons and 2D touch displays as well as a technological implementation alternative to be exploited in connection with 3D gesture tracking and position tracking among other potential applications.

According to an exemplary embodiment of the present invention the functional components that may be utilized in connection with the present invention include touch-based control input sensing components, such as strain, resistive, capacitive and optical sensing components. Optical and strain sensing components such as light detectors, cameras (image sensors), and strain gauges may preferably be embedded in the housing material surrounding and/or underlying the touching area often constructed utilizing some optically sufficiently transparent material such as glass or plastic. Optical sensing components may, in addition to the aforesaid light/radiation-receiving components, be also supplemented with or considered to incorporate embedded light-emitting components such as (O)LEDs ((organic) light-emitting diode) configured to cooperate with the receivers to implement the touch sensing functionality such as a free-space (optical grid on the display)-based touchscreen or (F)TIR-based touchscreen. Resistive and capacitive sensing components may be utilized by embedding the sensing components within the intended touching area, for example. In one feasible embodiment the entire housing of the device may be molded as substantially one piece, optionally of optically sufficiently transparent material regarding the desired wavelengths, wherein the touch-sensing components, e.g. resistive or capacitive components, may be embedded.

In further, tactile and/or vibration components may be utilized in connection with the present invention embedded in the housing material so as to enable functional linkage with the sensing components. Thus, spatially precise, input-location matching, tactile feedback may be arranged regarding touch input substantially in real-time. Further on, vibration applying functions may be executed in response to some device-specific action such as incoming communication, e.g. a phone call or short message service (SMS). To provide the electronic device with tactile/vibrating alarm or feedback functionality the device may utilize at least one piezoelectric actuator or vibration motor.

In further, light emitting components, such as light emitting diodes (LEDs) may be utilized in connection with the present invention optionally embedded at least partially in the housing to provide a functional linkage with the sensing components and/or indicating other operational states and/or differing levels of function of the electronic device or its subunits. In addition to using light emitting components as indicators, said components may be utilized in any way advantageous for an application of the present invention. As an example of the teachings of the present invention, a functionally linked set of light emitting components and capacitive components may be utilized to enable a visible indication of a touch input or vice versa a visible attention signal may be output to notify a user to make a touch input based action or selection.

In further, additional elements and related functionalities may be embedded in the housing material. E.g. additional optical sensing components such as photodiodes or image sensors applicable in Ambient Light Sensing and/or Proximity Sensing components may be embedded. Ambient light sensing may be utilized for automatically regulating the screen brightness on basis of the observations of the ambient lighting and proximity sensing (e.g. infrared transmitter/receiver) may be utilized to detect the presence of nearby objects without any physical contact, for instance.

Various other elements may also either alternatively or additionally be integrated into the housing. Elements such microphones, communication chips (e.g. wireless transceiver such as Bluetooth chip or a radio frequency identification/near field communication tag or transceiver), wired communication interfaces, memory and/or device control parts such as a processing unit may be embedded therein.

According to an exemplary embodiment of the present invention the electronic device comprises a housing, or a 'cover', the housing material molded into a desired target shape, and a plurality of at least essentially partially embedded functional elements connected with the enabling arrangement.

According to an exemplary embodiment of the present invention the enabling arrangement comprises a first plurality of connecting means to establish a connection between the plurality of functional elements and said enabling arrangement and one or more second connecting means to be connected to a host device utilizing the functionalities associated with the functional The first plurality of connection means comprises a connector, to whose connections a conductor of one or more functional elements can be connected to. The number of available connections said connector provides is advantageously at least the number of individual connections needed by the utilized functional elements. Depending on the connected element, the signal carried by a conductor connected to a connector connection may be an analog or digital, electric or optical The one or more second connecting means may include a Wireless Local Area Network (WLAN), Bluetooth, infrared, and/or an interface for a fixed/wired connection, such as an Universal Serial Bus (USB) port, a LAN (e.g. Ethernet) interface, or Firewire-compliant (e.g. IEEE 1394) interface, a controller are network (CAN) bus connection or some other electric or optical I/O connection or wireless transceiver connection. The signals carried by this connection follow an agreed structure and protocol of the associated connection type.

To achieve the objective according to the present invention, further there can be several types of enabling arrangements, categorized by the number of connections they provide of each type of connections. Thus, a "universal" enabling arrangement can be chosen for a design based on the number of utilized functional elements and the connection type of the host device utilizing the functionalities associated with the functional elements. In other words, the number of provided connector connections of the enabling arrangement defines the maximum number of individually connected functional elements that can be utilized in connection to that arrangement. To achieve the objective of the present invention, it is not necessary to have all the connector connections of the enabling arrangement connected to a conductor, that is, a number of connector connections may be left unconnected.

The connector may use one or more techniques to indicate and alert signal transfer, such as polling of the functional elements or interrupt driven I/O where the functional elements initiate the transfer. The I/O may be programmed so that the enabling arrangement may transfer the signal to the designated destination or the functional elements may use a direct access technique assuming control of the enabling arrangement signal bus to access the designated destination.

According to a further exemplary embodiment of the present invention, the enabling arrangement according to the present invention comprises a memory for storing and retrieval of instructions and configuration data and processing means capable of transforming signals from a one known format to another predetermined format according to stored instructions and configuration data.

The memory, which may be divided between one or more physical memory chips and/or cards, physically located within the enabling arrangement and/or the host device, may comprise necessary code, e.g. in a form of a computer program/application, for enabling the control and operation of the enabling arrangement and/or the connector. The memory may include e.g. ROM (read only memory) or RAM-type (random access memory) implementations. The memory may further refer to an advantageously detachable memory card/stick, a floppy disc, an optical disc, such as a CD-ROM, or a fixed/removable hard drive that may be connected to the module either during a configuration or use of the device.

The processing means, e.g. at least one processing/controlling unit such as a microprocessor, a DSP (digital signal processor), a micro-controller or programmable logic chip(s), optionally comprising a plurality of cooperating or parallel (sub-)units, physically located within the enabling arrangement and/or at least partially in the host device may be needed for the actual execution of the instructions and processing of the configuration data that may be stored in memory as mentioned above.

The enabling arrangement acts as a transceiver, transmitting signals received from the host device to an addressed functional element in a compatible signal format of the element and/or transmits signals received from functional element in an agreed structure and protocol of the applied connection type towards the host device. Further, the enabling arrangement can optionally at least partially function as a signal bus provider, where an intelligent functional element or the host can assume control over the signal bus the enabling arrangement provides.

As the number of connections provided of each type of connections is known for a category of enabling arrangements, the arrangements can readily be provided with suitable preset instructions and configuration data. Possible changes or additions to the configuration of the arrangement in a specific use case can then easily be made in batches and preferably using ready-made configuration sets. Thus, case-by-case manual configurations and design realizations either using dedicated controllers or software tailoring at the host device can be avoided. Further, error prone approaches of configuration can be avoided by using tested and approved presets and configuration sets.

According to an exemplary embodiment of the present invention one or more embedded elements may be provided on a base material (substrate) e.g. before or during embedding in the housing material. Optionally, the enabling arrangement may be provided at least partially on a base material (substrate) e.g. before or during embedding in the housing material. The base material may be a flexible substrate optionally comprising plastics, silicon, rubber, or a mixture of these. The base material may be a thin underlay such as a film or sheet. The base may consist of one unitary piece or several pieces brought together before or during the molding process. The base material may be configured to provide electric conductivity within the base material and/or providing electricity from and/or to other parts in the electronic device. Therefore, the base material may contain a number of recesses, cavities, or holes for accommodating electronics such as electronic circuits, conductors, etc. Further, the electronics may be provided on the substrate, e.g. by utilizing a selected printing technique, or attached as ready-made entities, e.g. SMT (surface-mount technology) and/or flip chip entities, to the substrate by e.g. glue or other adhesive.

In further, either supplementary or alternative, the housing is manufactured by over-molding such as injection molding. The elements to be embedded in the housing material and optionally the enabling module at least partially may be placed directly in the mold frame on preferred places or the elements and optionally the enabling module at least partially may be provided first on a base component which is then placed inside the mold frame. In various embodiments the elements and optionally the enabling module at least partially may be provided partially on a base component and partially directly inside of the mold frame.

Other feasible base material or housing material manufacturing methods comprise e.g. in-mold labeling (IML) and in-mold decoration (IMD). Further on, the base material may be preformed to a preferred and/or predetermined shape before injection molding or IML by e.g. thermoforming.

In accordance with a further aspect of the present invention and the embedding approaches mentioned earlier, the enabling arrangement may be a Single Package architecture, where the preferred embodiment comprises a System on a Chip (Soc) or a System on Package integrated arrangement. Through fine lithography, current materials, and larger chips and wafers with high clock frequency, the integration of large amount of functionality at an affordable cost is made possible. It is usual to have dual- and multi-core processors that perform multiple functions on a single chip.

Instead of integrating all or most of the system needs on large and complex single chips, smaller, high-yielding chips can be reconstituted to behave like large chips as multi-chip modules (MCMs). Said modules can offer an alternative approach to SoCs by interconnecting dozens of chips in a small, horizontal form factor for high signal speed.

Mobile devices of many forms are in high demand bringing an ever increasing quest for signal processing, flash memory, and wireless communications in a system that is held in one's hand and sold at consumer prices. In accordance with a further aspect of the present invention IC and component packaging, such as 3-D chip stacking of either bare chips or packaged chips, can be used. The present invention with its embedding approach brings a feasible solution to required interconnections from chip-to-chip, packaging, which is critical for these kind architectures and the weak point in existing solutions. This kind of approach can be a systems-in-package (SiP). A SiP is a vertical MCM, in contrast to horizontal MCMs for high performance computers of the previous era.

In existing mobile devices such as cell phones, typically something like 10% of the system components are made up of ICs. The remaining 90% are passive components, boards, and interconnections. This problem can be further addressed by the present invention and its preferred embodiments by a systems-on-package (SoP) approach. SoP addresses the system integration problem by making mill scale discrete components into micro or nano scale embedded thin-film components, thus reducing system size.

Intelligent and developed systems packaging is a critical issue dictated by emerging needs of electronic systems. Mainframe computers of the 80's benefited of MCMs. High-end networking, signal processing, and digital communication benefit of SoC—representing a confluence of previous product classes through integration of technology and design elements from other system driver classes such as microprocessor, application specific IC (ASICS) and analog/mixed signal circuits. Cell phones and handsets benefit of SiPs solutions. These benefits include user IP integration, IP reuse, mixed analog/digital design, low design risk, integration of large memories, reduced process complexity, low developmental cost, and shorter time-to-market. SiP brings together ICs including SoCs and discrete components using lateral or vertical integration technologies.

As a further enabling approach for the enabling arrangement of the present invention in the context of multifunctional portable structures for high demand devices, by integrating thin-film components on a package substrate, SoP is a further feasible embodiment platform in context of the present invention. The latency effect can be considerably minimized and RF-components such as capacitors, filters, antennas, and high-Q inductors can be better fabricated on a package substrate than on silicon. High-speed, board-level, optical interconnection can be used in the package replacing common conductors, addressing both the resistance and cross-talk issues of electronic ICs. Further, waveguides, gratings, detectors, and couplers can all be embedded in the SoP substrate. Bioelectronics and integrated electronic and bio-electronic systems such as bio-sensing elements, control/feedback electronics, display and RF/wireless components such as integrated antenna, RFID in a SoP platform makes this technology feasible for systems for which the present invention pertains to.

In accordance with a further embodiment of the present invention, the enabling arrangement according to the present invention can be realized using a Single Package (SP), of any of the previously described approaches, comprising means of connectivity and communication between a plurality of functional elements and a host device, the communication including bidirectional multiple analog and/or digital signal communication and processing of said signals. Further, said SP may include hardware and instruction sets for processing said signals after an optional A/D-conversion. The aim of the present invention is to integrate and feasibly embed the structure of functional elements and the elements of the enabling arrangement as to the objectives of the present invention.

In accordance with one aspect of the present invention a method for permitting the interconnection of a plurality of functional elements and a host device utilizing functionality associated with said functional elements, said method comprising:

establishing a network over which said plurality of functional elements and host device each having a connector connection can selectively communicate, processing a received signal employing programmed rules, and transmitting said processed signal by identifying the source connection and/or destination connection of said connector.

According to an exemplary embodiment of the present invention the method is configured to be carried out on an embodiment of the electronic device in accordance with the present invention.

The previously presented considerations concerning the various embodiments of the electronic device may be flexibly applied to the embodiments of the related housing or method mutatis mutandis and vice versa, as being appreciated by a skilled person.

As briefly reviewed hereinbefore, the utility of the different aspects of the present invention arises from a plurality of issues depending on each particular embodiment. The manufacturing costs for producing the electronic device in accordance with the present invention to provide a plurality of different functionalities and easy connectivity may be kept low due to rather extensive use of affordable and easily obtainable materials, elements, and process technology. The obtainable housing/electronic device is scalable from handheld mobile devices and game consoles to larger applications. The feasible process technology also provides for rapid industrial scale manufacturing of the device in addition to mere prototyping scenarios.

The device may be kept thin, light, and energy conserving in order to suit most use scenarios with little modifications to the surrounding components and designs. The obtained integration level is high. The device structure, embedded elements and connections may be made robust towards external impacts considering the compact structure that is attained. This will offer better protection for the applied elements and connections of the device.

Yet, the housing structure and connections suit particularly well various industrial applications including e.g. industrial automation/electronics control apparatuses, as it may provide hermetical and dust repelling isolation from the hostile use environment with e.g. humid and/or dusty air.

Regarding the potential replaceability of the housing, preferably executable without tools (e.g. snap-fit), a number of related benefits may be conceived. A housing of the device may be tailored for certain use and provided with related embedded functional elements and connection alternatives to host devices. Upon new use or breakage, the cover may be flexibly changed to a new one with similar or different functional elements embedded. All the possible elements do not have to be included in the same housing, which makes each individual housing simpler, lighter, smaller and also more affordable.

Still, touch-based input may be cleverly linked with accurate, location-specific tactile, e.g. haptic, feedback by means of the present invention.

The expression "a number of" may herein refer to any positive integer starting from one (1). The expression "a plurality of" may refer to any positive integer starting from two (2), respectively.

Different embodiments of the present invention are also disclosed in the attached dependent claims.

BRIEF DESCRIPTION OF THE RELATED DRAWINGS

Next, the embodiments of the present invention are more closely reviewed with reference to the attached drawings, wherein.

DETAILED DESCRIPTION OF THE EMBODIMENTS

Figure 1:
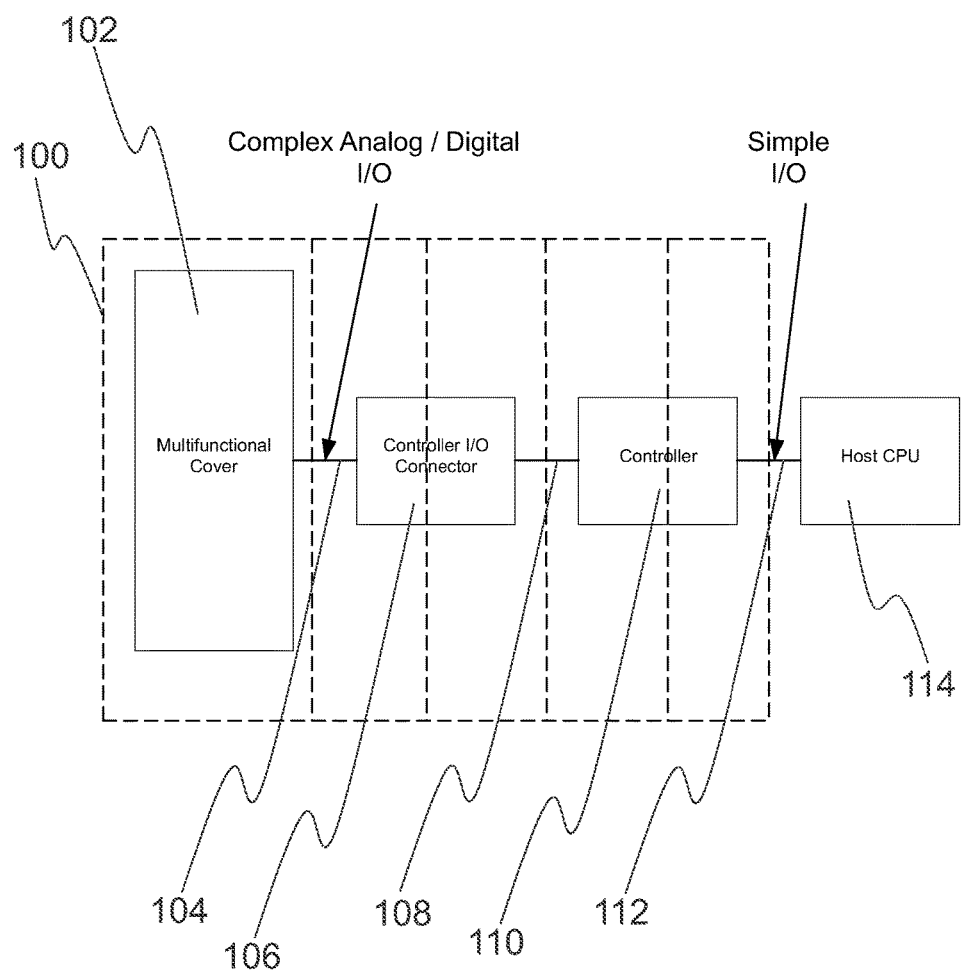
FIG. 1 illustrates an exemplary configuration of an electronic device in accordance with one embodiment of the present invention.

With reference to FIG. 1, a system block diagram of one embodiment of the present invention is illustrated. The electronic device 100 and/or the enabling arrangement may comprise various additional components, in addition to the disclosed ones. As being appreciated by skilled readers, also the configuration of the disclosed components may differ from the explicitly depicted ones depending on the requirements of each intended use scenario wherein the present invention may be capitalized.

A base material may be used for providing a support surface for the functional elements/components 102, connectors 106, controller 110 and I/O arrangements 104, 106, 108, 112 or parts of them to be attached/provided thereto, which will then facilitate embedding the elements further on in the device 100 housing. In FIG. 1, the functional components 102 and/or other elements with described functionalities may herein be referred to as a multifunctional cover 102 in contrast to the elements of the enabling arrangement. The upright dotted lines represent as an example some possible levels and realizations thereof of embedding the various components in the device 100 housing structure. Each area between the upright dotted lines represents an exemplary partition of the constituting components 102 and parts of the enabling arrangement and the electronic device 100, each of the areas defining a part of the arrangement and/or device 100 capable of being at least partially embedded in the base material and/or the housing structure. The skilled persons will again appreciate the fact that the disclosed embodiment was constructed for illustrative purposes only, and the innovative fulcrum reviewed herein will cover further possible partitionings of said arrangement and device 100 to achieve the desired number, level, distribution and allocation of embedded components 102, 104, 106, 108, 110, 112.

In the present embodiment the enabling arrangement is divided into essentially separate connector 106 and controller 110 units, laid on the base material, with the connector 106 having suitable number of first connection means 104 according to the amount of functional components 102 used and a simple second connection means 112 for connecting a host device 114 or other functional element with the electronic device 100. The connector 106 and controller 110 are essentially integrated or connected with any known feasible connection 108. In addition, configuration of the enabling arrangement e.g. with another device, host device 114 or other functional element may be done to the controller 110, which is essentially housed in the electronic device 100, by using the second connection means 112, which allows for configuring the electronic device 100, with its functional elements 102 and/or the enabling arrangement for example for different host devices (host CPUs) 114 and/or other functional elements.

The base material may establish optionally flexible substrate, e.g. circuit board, optionally comprising plastics, silicon, rubber, or a mixture of these. The base material may thus be a thin underlay such as a film or sheet. The base component may consist of one unitary piece or several pieces brought together before or during the molding process. The base material may be configured to provide electric conductivity within the base material and/or providing electricity from and/or to other parts in the electronic device 100. Therefore, the base material may contain a number of recesses, cavities, or holes for accommodating various light electronics such as electronic circuits, conductors, etc. in the substrate. Alternatively, the electronics and/or functional elements 102 may be provided on the substrate, e.g. by utilizing a selected printing technique, or attached as readymade entities, e.g. SMT (surface-mount technology) and/or flip chip entities, to the substrate by e.g. glue or other adhesive.

In some embodiments, the base material may comprise polyimide (PI). Polyimide may be utilized to construct flexible, preferably transparent, base elements, or 'substrates'.

In some embodiments, FR-4 material may be utilized as base material. For example, a printed circuit board (PCB) may be formed.

The functional elements 102 may comprise touch sensing and tactile/vibrating alarm or feedback functionality providing components. Further, they may comprise e.g. sound input (microphone) devices, output devices (beeper/buzzer, loudspeaker), visible or non-visible lights (LEDs, etc.), ALS devices, PS devices, processing devices (microprocessor, microcontroller, digital signal processor (DSP)), and/or memory chips, or programmable logic chips in addition to various still unmentioned sensors. Indeed, a myriad of technologies may be implemented.

In the embodiment shown in FIG. 1, wherein the base material is designed to surround and thus define for example a touching area in or upon the cover structure, the functional elements 102 may be chosen as to comprise e.g. strain and/or optical sensing components. The placing or number of functional elements 102 is not restricted and depends considerably on the application and the used technology, which will be apparent to a person skilled in the art. E.g. the functional elements 102 may be evenly distributed on the periphery in the cover structure of FIG. 1 or more selectively in key places such as the corners of the touching area.

The applied tactile and/or vibration components providing the electronic device 100 with tactile/vibrating alarm or feedback functionality may comprise at least one piezoelectric actuator or vibration motor. Efficient integration with the housing ensures an efficient tactile feedback to the user.

With integration of multiple tactile and/or vibration components the tactile feedback may be tailored more accurate. The tactile components may be configured in a systematic (matrix etc.), potentially symmetric, formation covering evenly the entire surface or evenly "orbiting" the touch surface, for instance. A formation connected with the touch-sensing components may provide the user with more area-specific feedback providing a superior user experience. E.g. when the entire surface is evenly (at least functionally, e.g. in the periphery) covered by the tactile components and the user provides pressure on a specific point (e.g. touch-based usage with finger or stylus) the nearest tactile component(s) may be configured to respond(s) by giving associated vibration/tactile feedback, hence, providing the user with location-wise accurate, targeted feedback, not just vibration/tactile feedback in general. This may be particularly beneficial in multi-touch applications, for example, wherein the user may simultaneously contact a touch surface via multiple points.

Further on, the electronic device 100 of the present embodiment comprises the preferred functionalities according to the components used and the enabling arrangement for connecting a host device 114 or other functional element to utilize the electronic device 100 and the associated functionalities.

According to some other exemplary embodiments the base material may be used to provide support for the functional elements 102 whereas the I/O connector 106 and/or the controller 110 may be outside the base material. The host device 114 and/or the functional elements 102 may optionally at least partially use direct access to assume control over a signal bus provided by said controller 110. The connector 106 can be chosen from a category of connectors compliant with the host 114 I/O type and number and type of functional elements 102.

The shape and size of either the base material component or the molded housing together defining the cover structure is not restricted to any particular form and may thus be manufactured to fit a wide range of applications.

In determining the suitable elements 102 and other components/electronics, specific care must be taken that the individual components and material selections work together and survive the selected manufacturing process of the overall arrangement, which is naturally preferably checked up-front on the basis of the manufacturing process vs. element data sheets, or by analyzing the produced prototypes, for example. The base material, described previously, is manufactured to a desired shape and size.

The preferred functional elements 102 with different functionalities, such as touch sensing components and tactile and/or vibration components are attached to the base material. Supplementary elements and electronics, listed previously, may also be added onto the material. Alternatively, the elements 102 and/or electronics may be provided within the substrate. The components, elements and electronics may so comprise a structure, "multifunctional cover", which is attached to the base material or they may be attached to the base material directly.

For example, at least one substrate layer such as a sheet or film may be first provided with electronics such as conductors, and desired control circuitry. The associated chips and other entities may be provided onto the substrate by a flip-chip bonding apparatus or constructed utilizing an ink-jet printer, for example.

Elements 102 and electronics may be attached to the target substrates by adhesive, such as an epoxy adhesive, for example. Both conductive (for enabling electrical contact) and non-conductive (for mere fixing) adhesives may be utilized. Such components are preferably selected so as to withstand the pressure and temperature of the utilized housing component-establishing process such as injection molding process.

Accordingly, suitable printing technologies may also be exploited. E.g. components may be printed on the substrate by an inkjet printer or other applicable device.

Generally, feasible techniques for providing printed electronics may include screen printing, rotary screen printing, gravure printing, flexography, ink-jet printing, tampo printing, etching (like with PWB-substrates, printed wiring board), transfer laminating, thin-film deposition, etc. For instance, in the context of conductive pastes, silver-based PTF (Polymer Thick Film) paste could be utilized for screen printing the desired circuit design on the substrate. Also e.g. copper or carbon-based PTF pastes may be used. Alternatively, copper/aluminum layers may be obtained by etching. In a further alternative, conductive LTCC (low temperature co-fired ceramic) or HTCC (high temperature co-fired ceramic) pastes may be sintered onto the substrate. Further, silver/gold-based nanoparticle inks could be used for producing the conductors.

The paste/ink shall be preferably selected in connection with the printing technique and the substrate material because different printing techniques require different rheological properties from the used ink/paste, for instance. Further, different printing technologies provide varying amounts of ink/paste per time unit, which often affects the achievable conductivity figures.

Generally in the embodiments of the present invention, the thickness of the established housing as well as the installation depth of said elements 102 and electronics in the housing may be varied according to the application so that they may form a part of the surface (inner or outer surface of the overall electronic device 100) thereof or be completely embedded, or 'hidden', inside the housing. This enables customization of the toughness, elasticity, transparency, etc., of the constructed device 100 as a whole as well as customization of the maintenance capabilities and protection of said embedded elements 102. Embedding the elements 102 completely inside the housing typically provides better protection. Optionally leaving the elements 102 to the surface provides less protection but enables easier maintenance or replacement of said elements 102. Depending on the application certain elements may be embedded entirely, when other elements are only partially embedded.

The use of advantageously flexible materials preferably enables carrying out at least some of the method items by roll-to-roll methods, which may provide additional benefits time-, cost- and even space-wise considering e.g. transportation and storage. In roll-to-roll, or 'reel-to-reel', methods the desired components, such as optical and/or electrical ones, may be deposited on a continuous 'roll' substrate, which may be both long and wide, advancing either in constant or dynamic speed from a source roll, or a plurality of source rolls, to a destination roll during the procedure. Thus the substrate may thus comprise multiple products that are to be cut separate later.

The roll-to-roll manufacturing advantageously enables rapid and cost effective manufacturing of products also in accordance with the present invention. During the roll-to-roll process several material layers may be joined together 'on the fly', and the aforesaid components such as electronics may be structured on them prior to, upon, or after the actual joining instant. The source layers and the resulting band-like aggregate entity may be further subjected to various treatments during the process. Layer thicknesses (thinner layers such as 'films' are generally preferred in facilitating roll-to-roll processing) and optionally also other properties should be selected so as to enable roll-to-roll processing to a preferred extent.

The device 100 may include, optionally as the host device 114, or constitute, a mobile terminal, a PDA (personal digital assistant), a control device for industrial or other applications, a specific- or multipurpose computer (desktop/laptop/palmtop), a music or multimedia player, etc. As being clear to a skilled person, various elements of the device 100 may be directly integrated in the same housing or provided at least with functional connectivity, e.g. wired or wireless connectivity, with each other.

One potential, if not mandatory, component that is included in the apparatus is a memory, which may be divided between one or more physical memory chips and/or cards, may comprise necessary code, e.g. in a form of a computer program/application, for enabling the control and operation of the apparatus. The memory may include e.g. ROM (read only memory) or RAM-type (random access memory) implementations. The memory may further refer to an advantageously detachable memory card/stick, a floppy disc, an optical disc, such as a CD-ROM, or a fixed/removable hard drive.

A processing component, e.g. at least one processing/controlling unit such as a microprocessor, a DSP (digital signal processor), a micro-controller or programmable logic chip(s), optionally comprising a plurality of cooperating or parallel (sub-)units, may be needed for the actual execution of the application code that may be stored in memory as mentioned above.

A display and possible traditional control input means, such as keys, buttons, knobs, voice control interface, sliders, rocker switches, etc. may provide the user of the device 100 with data visualization means and control input means in connection with the display panel. Nevertheless, a number of touch sensing components are preferably utilized for implementing the touch-based UI in accordance with the present invention.

Tactile and/or vibration components are preferably utilized for providing the electronic device 100 with tactile/vibrating alarm or feedback functionality in accordance with the present invention.

Data interface, e.g. a wireless transceiver (GSM (Global System for Mobile Communications), UMTS (Universal Mobile Telecommunications System), WLAN (Wireless Local Area Network), Bluetooth, infrared, etc), and/or an interface for a fixed/wired connection, such as an USB (Universal Serial Bus) port, a LAN (e.g. Ethernet) interface, or Firewire-compliant (e.g. IEEE 1394) interface, is typically required for communication with other devices.

The device 100 may include various alternative or supplementary elements such as camera, microphone, LED, Ambient Light Sensing and/or Proximity Sensing components as mentioned hereinbefore for providing the device 100 with desired functionalities. It is self-evident that further functionalities may be added to the device 100 and the aforesaid functionalities may be modified depending on each particular embodiment.

Figure 2:
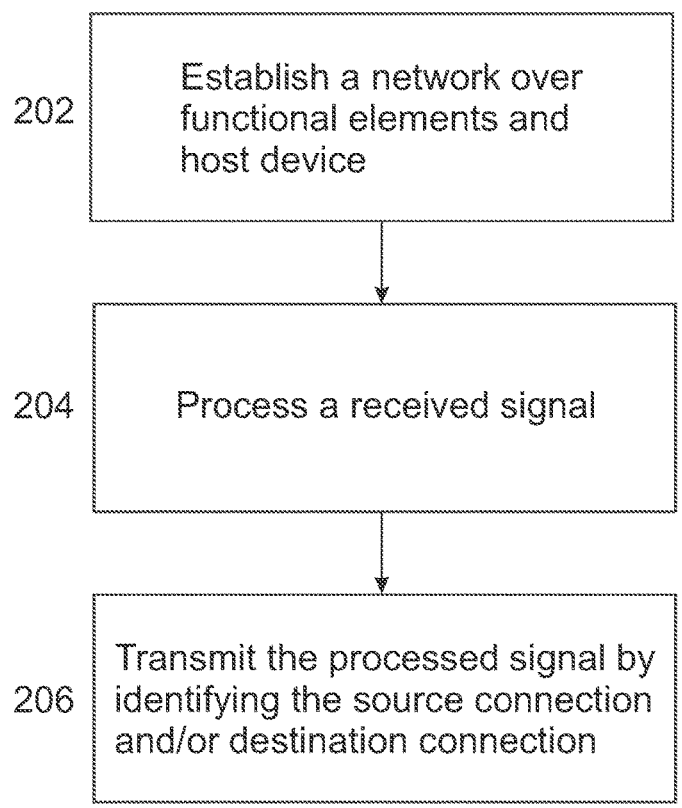
FIG. 2 illustrates a flow diagram of a method for permitting the interconnection of a plurality of functional elements and a host device in accordance with one embodiment of the present invention.

In accordance with one aspect of the present invention FIG. 2 illustrates as a flow diagram a method for permitting the interconnection of a plurality of functional elements and a host device utilizing functionality associated with said functional elements.

In a device according to the present invention an associated network is established 202 over which network said plurality of functional elements and host device each having a connector connection can selectively communicate. Further, upon receiving a signal by means of the established network and in response of said selective communication, said signal is processed 204 to transmit 206 the processed signal. The processing of a signal allows identifying the source connection and/or destination connection of the associated signal. Even further, the processing of a signal may include any conversion, adaptation, compilation etc. of the signal according to the source connection, destination connection and/or applicable programmed rules. Thus, it is evident, that the transmission of a signal is determined by source connection, destination connection and/or applicable programmed rules.

The scope of the invention is determined by the attached claims together with the equivalents thereof. The skilled persons will again appreciate the fact that the disclosed embodiments were constructed for illustrative purposes only, and the innovative fulcrum reviewed herein will cover further embodiments, embodiment combinations, variations and equivalents that better suit each particular use case of the invention. For instance, instead of a touch display, the suggested solution could be applied to implement a touchpad or some other touch/gesture input device with no mandatory display-associated function. Yet, instead of touch-based control input sensing components or tactile/vibration components, the first and second elements, respectively, could include some other type of functional elements such as the ones described hereinbefore.

The invention claimed is:

1. A housing structure defining at least part of a cover of a host device, the housing structure comprising:
at least one substrate provided with a plurality of functional elements and a system-on-a-chip;
housing material molded into a target shape so as to at least partially embed the plurality of functional elements and the system-on-a-chip provided on the at least one substrate, the at least one substrate preformed to a selected shape by thermoforming prior to molding of the housing material thereon, the system-on-a-chip comprising:
a connector with a plurality of connecting elements to establish a connection between the plurality of functional elements and the system-on-a-chip,
a communications interface connected to the host device of the housing structure to enable the host device to utilize a number of functionalities associated with functional elements provided in the housing structure,
a memory for storing and retrieval of instructions, and
a processing unit configured to transform signals transferred between the plurality of functional elements of the housing structure and the host device from a known format to another predetermined format according to stored instructions.

2. The housing structure of claim 1, wherein the at least one substrate accommodating the functional elements and the system-on-a-chip comprises a flexible film substrate.

3. The housing structure of claim 1, wherein the plurality of functional elements comprise at least two components selected from the group consisting of:
strain, resistive, capacitive and optical sensing component, piezoelectric actuator, vibration motor, light emitting component, a microphone, a loudspeaker, a data processing device, a memory chip, a communications chip, a proximity sensor, and an ambient light sensor.

4. The housing structure of claim 1, wherein the functionalities associated with the plurality of functional elements comprise at least one function selected from the group consisting of:
tactile feedback, haptic feedback, vibration, communication, visible signal output, sound output, sound input, data processing, data storage, proximity sensing, and ambient light sensing.

5. The housing structure of claim 1, wherein the plurality of connecting elements comprises at least two connection terminals each prepared to be connected to a conductor carrying an analog or digital signal.

6. The housing structure of claim 1, wherein a number of the plurality of connecting elements is greater or equal to a number of the plurality of functional elements.

7. The housing structure of claim 1, wherein said communications interface is at least one interface selected from the group consisting of:
WLAN interface, Bluetooth interface, infrared interface, USB port interface, LAN (e.g. Ethernet) interface, Firewire-compliant (e.g. IEEE 1394) interface, a CAN bus connection interface.

8. The housing structure of claim 1, wherein the instructions include preset instructions representing a preselected group of the plurality of connecting elements.

9. A method for permitting the interconnection of a plurality of functional elements and a host device utilizing functionality associated with said functional elements, said method comprising:
providing a housing structure defining at least part of a cover of the host device, said housing structure including at least one substrate provided with said plurality of functional elements and a system-on-a-chip, the housing structure including housing material molded into a target shape to at least partially embed the plurality of functional elements, the at least one substrate preformed to a selected shape by thermoforming prior to molding of the housing material thereon;
establishing, by the system-on-a-chip, a network over which the plurality of functional elements and the host device, each having a connector connection, can selectively communicate;
processing, by the network, a received signal employing programmed rules, and
transmitting, by the network, the processed signal by identifying the source connection and/or destination connection of the connector.

10. A housing structure defining at least part of a cover of a host device, the housing structure comprising:
at least one substrate provided with plural cavities, the at least one substrate preformed to
a selected shape by thermoforming prior to molding of a housing material thereon;
a plurality of functional elements, each of said functional elements being at least partially embedded in a respective one of the cavities provided on the at least one substrate; and
a system-on-a-chip comprising:
a connector with a first plurality of connecting elements establishing a connection between the plurality of functional elements and the system-on-a-chip,
a communications interface connectable to the host device of the housing structure to enable the host device to utilize a number of functionalities associated with the functional elements provided in the housing structure,
a memory for storing and retrieval of instructions, and
a processing unit configured to transform signals transferred between the plurality of functional elements of the housing structure and the host device from a one known format to another predetermined format according to the instructions stored in the memory.

11. The housing structure of claim 10, wherein the system-on-a-chip is at least partially embedded in a further respective one of the cavities provided on the at least one substrate.

12. The housing structure of claim 10, wherein the at least one substrate comprises a flexible film substrate.

13. The housing structure of claim 11, wherein the at least one substrate comprises a flexible film substrate.

14. The housing structure of claim 10, wherein, the plurality of functional elements comprise at least two components selected from the group consisting of:
strain, resistive, capacitive and optical sensing component, piezoelectric actuator, vibration motor, light emitting component, a microphone, a loudspeaker, a data processing device, a memory chip, a communications chip, a proximity sensor, and an ambient light sensor, wherein the plurality of connecting elements comprises at least two connection terminals, each of the at least two connection terminals prepared to be connected to a conductor carrying an analog or digital signal, and the instructions include preset instructions representing a preselected group of the plurality of connecting elements.

15. The housing structure of claim 11, wherein, the plurality of functional elements comprise at least two components selected from the group consisting of:

strain, resistive, capacitive and optical sensing component, piezoelectric actuator, vibration motor, light emitting component, a microphone, a loudspeaker, a data processing device, a memory chip, a communications chip, a proximity sensor, and an ambient light sensor, wherein said plurality of connecting elements comprises at least two connection terminals, each of said at least two connection terminals prepared to be connected to a conductor carrying an analog or digital signal, and said instructions include preset instructions representing a preselected group of the plurality of connecting elements.

16. The housing structure of claim 1, wherein the plurality of functional elements includes at least one of a vibration motor, an RFID transceiver, a NFC transceiver, or an OLED.

17. The housing structure of claim 16, wherein the plurality of functional elements includes a vibration motor and at least one of an RFID transceiver, a NFC transceiver, or an OLED.

18. The housing structure of claim 1, wherein the plurality of functional elements includes a vibration motor, an RFID transceiver, a NFC transceiver, and an OLED.

19. The housing structure of claim 1, wherein the at least one substrate, including the plurality of functional elements and the system-on-a-chip, is preformed to the selected shape by thermoforming prior to molding of the housing material thereon.

* * * * *